United States Patent
You et al.

(10) Patent No.: US 9,810,942 B2
(45) Date of Patent: Nov. 7, 2017

(54) QUANTUM DOT-ENHANCED DISPLAY HAVING DICHROIC FILTER

(71) Applicant: Apple Inc., Cupertino, CA (US)

(72) Inventors: Chenhua You, San Jose, CA (US); Jun Qi, Cupertino, CA (US); Fan-Chung Hsu, Los Altos, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 14/944,016

(22) Filed: Nov. 17, 2015

(65) Prior Publication Data

US 2016/0070137 A1 Mar. 10, 2016

Related U.S. Application Data

(63) Continuation-in-part of application No. 13/630,785, filed on Sep. 28, 2012, now abandoned.

(60) Provisional application No. 61/660,501, filed on Jun. 15, 2012.

(51) Int. Cl.
G02F 1/1335 (2006.01)

(52) U.S. Cl.
CPC .. G02F 1/133603 (2013.01); G02F 1/133609 (2013.01); *G02F 1/133615* (2013.01); *G02F 2001/133614* (2013.01); *G02F 2202/108* (2013.01)

(58) Field of Classification Search
CPC ............. G02F 1/133615; G02F 1/133603
USPC ........................................................ 349/65
See application file for complete search history.

(56) References Cited

U.S. PATENT DOCUMENTS

| | | | |
|---|---|---|---|
| 5,869,919 | A | 2/1999 | Sato et al. |
| 6,115,618 | A | 9/2000 | Lebby et al. |
| 6,512,670 | B1 | 1/2003 | Boehme et al. |
| 6,630,970 | B2 | 10/2003 | Trapani et al. |
| 6,720,961 | B2 | 4/2004 | Tracy et al. |
| 6,906,762 | B1 | 6/2005 | Witehira et al. |
| 6,937,249 | B2 | 8/2005 | Herbert et al. |
| 7,110,104 | B2 | 9/2006 | Choi et al. |
| 7,182,463 | B2 | 2/2007 | Conner et al. |
| 7,205,959 | B2 | 4/2007 | Henriksson |

(Continued)

FOREIGN PATENT DOCUMENTS

| | | |
|---|---|---|
| CN | 1662625 | 8/2005 |
| CN | 1979231 | 6/2007 |

(Continued)

OTHER PUBLICATIONS

Author Unknown, "Visual Impact/Usability Benefits," PureDepth, http://www.puredepth.com/technologyPlatform_visualImpactAndUsabilityBenefits, 2 pages, at least as early as Jan. 20, 2010.

(Continued)

*Primary Examiner* — Edmond Lau
(74) *Attorney, Agent, or Firm* — Joseph F. Guihan (57) ABSTRACT

A display device is provided. The display device includes a light source emitting a blue light and a light emitting layer including a first group of red quantum dots and a second group of green quantum dots. The light emitting layer is configured to absorb a first portion of the blue light from the light source to emit red light and green light and to transmit a second portion of the blue light. The display device also includes dichroic filter layers to improve light recycling and backlight efficiency.

18 Claims, 10 Drawing Sheets

(56) References Cited

U.S. PATENT DOCUMENTS

| | | | |
|---|---|---|---|
| 7,221,332 B2 | 5/2007 | Miller et al. | |
| 7,232,058 B2 | 6/2007 | Lee | |
| 7,301,691 B2 | 11/2007 | O'Donnell | |
| 7,413,331 B2 | 8/2008 | Hatanaka et al. | |
| 7,505,049 B2 | 3/2009 | Engel | |
| 7,587,120 B2 | 9/2009 | Koo et al. | |
| 7,619,585 B2 | 11/2009 | Bell et al. | |
| 7,619,604 B2 | 11/2009 | Karman et al. | |
| 7,626,594 B1 | 12/2009 | Witehira et al. | |
| 7,701,427 B2 | 4/2010 | Yamagishi | |
| 7,724,208 B1 | 5/2010 | Engel et al. | |
| 7,730,413 B1 | 6/2010 | Engel et al. | |
| 7,746,423 B2 | 6/2010 | Im et al. | |
| 7,773,413 B2 | 8/2010 | Shalvi | |
| 7,962,186 B2 | 6/2011 | Cui et al. | |
| 8,054,391 B2 | 11/2011 | Ishikawa et al. | |
| 8,072,402 B2 | 12/2011 | Xu | |
| 8,104,816 B2 | 1/2012 | Lupton et al. | |
| 8,106,852 B2 | 1/2012 | Fujinawa et al. | |
| 8,115,700 B2 | 2/2012 | Schlottmann et al. | |
| 8,146,277 B2 | 4/2012 | Engel | |
| 8,228,323 B2 | 7/2012 | Bandel et al. | |
| 8,243,426 B2 | 8/2012 | Chen et al. | |
| 8,456,412 B2 | 6/2013 | Honbo | |
| 2002/0000967 A1 | 1/2002 | Huston et al. | |
| 2003/0160767 A1 | 8/2003 | Wong et al. | |
| 2003/0198008 A1 | 10/2003 | Leapman et al. | |
| 2005/0270775 A1* | 12/2005 | Harbers | G02B 27/1046 362/231 |
| 2007/0030867 A1 | 2/2007 | Park et al. | |
| 2007/0195279 A1 | 8/2007 | Park | |
| 2008/0049168 A1 | 2/2008 | Kubota | |
| 2008/0049431 A1 | 2/2008 | Boek et al. | |
| 2008/0122865 A1 | 5/2008 | Vanmoor | |
| 2008/0174724 A1 | 7/2008 | Nakayama et al. | |
| 2008/0231548 A1 | 9/2008 | Koyama | |
| 2009/0066890 A1 | 3/2009 | Harding et al. | |
| 2009/0073687 A1* | 3/2009 | Kiser | G02B 27/102 362/231 |
| 2009/0103293 A1* | 4/2009 | Harbers | F21V 3/04 362/231 |
| 2009/0135090 A1 | 5/2009 | Kim | |
| 2009/0174846 A1 | 7/2009 | Ito | |
| 2009/0201577 A1 | 8/2009 | LaPlante et al. | |
| 2009/0262084 A1 | 10/2009 | Yu | |
| 2009/0284984 A1 | 11/2009 | Krijn et al. | |
| 2010/0091039 A1 | 4/2010 | Marcu et al. | |
| 2010/0091048 A1 | 4/2010 | Aitken et al. | |
| 2010/0238366 A1 | 9/2010 | Chang et al. | |
| 2010/0265648 A1 | 10/2010 | Hirabayashi | |
| 2010/0277890 A1 | 11/2010 | Lewis et al. | |
| 2010/0296266 A1* | 11/2010 | Dussault | G02F 1/133605 362/84 |
| 2011/0007245 A1 | 1/2011 | Yoon et al. | |
| 2011/0085108 A1* | 4/2011 | Park | G02B 5/0231 349/61 |
| 2011/0090142 A1 | 4/2011 | You et al. | |
| 2011/0091051 A1 | 4/2011 | Thomason et al. | |
| 2011/0128477 A1 | 6/2011 | Izaki et al. | |
| 2011/0141769 A1* | 6/2011 | Lee | G02B 6/0023 362/629 |
| 2011/0148818 A1 | 6/2011 | Jhu et al. | |
| 2011/0175902 A1 | 7/2011 | Mahowald | |
| 2011/0180766 A1 | 7/2011 | Jang et al. | |
| 2011/0199726 A1 | 8/2011 | Moser | |
| 2012/0188245 A1 | 7/2012 | Hyatt | |
| 2012/0307364 A1 | 12/2012 | Chen et al. | |
| 2013/0084796 A1 | 4/2013 | Kerr | |
| 2013/0194281 A1 | 8/2013 | Chen et al. | |

FOREIGN PATENT DOCUMENTS

| | | |
|---|---|---|
| CN | 101243337 | 8/2008 |
| CN | 101495891 | 7/2009 |
| EP | 0272655 | 6/1988 |
| EP | 1158484 | 11/2001 |
| EP | 1355221 | 10/2003 |
| EP | 1962265 | 8/2008 |
| EP | 1390938 | 12/2008 |
| EP | 2494603 | 9/2012 |
| JP | 06006733 | 1/1994 |
| JP | 9-318817 | 12/1997 |
| JP | 2005227334 | 8/2005 |
| JP | 2008224331 | 9/2008 |
| JP | 2009266687 | 11/2009 |
| WO | 0109664 | 2/2001 |
| WO | 0115128 | 3/2001 |
| WO | 2005059880 | 6/2005 |
| WO | 2006112740 | 10/2006 |
| WO | 2011097393 | 8/2011 |
| WO | 2012068543 | 5/2012 |

OTHER PUBLICATIONS

Bertolucci, Jeff, "Offbeat Tech: The Misfits of CES," http://www.pcworld.com/article/186406/samsung_transparent_14inch_oled_laptop.html, 2 pages, Jan. 8, 2010.

Lau, "High-speed short-range systems for wireless personal area networks," Wireless Telecommunications Symposium, WTS 2009, IEEE, Piscataway, New Jersey, USA, Apr. 22, 2009, 4 pages.

* cited by examiner

QUANTUM DOT-ENHANCED DISPLAY HAVING DICHROIC FILTER

CROSS-REFERENCE TO RELATED APPLICATION

This application is a continuation-in-part of patent application Ser. No. 13/630,785, filed Sep. 28, 2012, which claims the benefit of provisional patent application No. 61/660,501, filed Jun. 15, 2012, which are hereby incorporated herein by reference in their entireties.

TECHNICAL FIELD

The present invention generally relates to display devices. More specifically, the invention relates to a display having a dichroic filter.

BACKGROUND

A quantum dot-enhanced liquid crystal display uses quantum dots to facilitate display of electronic information. As one example, Quantum dots (QDs) are semiconductors in the form of nanocrystals that provide an alternative display. The electronic characteristics of the QDs are generally governed by the size and shape of the nanocrystals. Quantum dots of the same material, but with different sizes, can emit light of different colors when excited. More specifically, the emission wavelength of the QDs varies with a size and shape of the quantum dots. As one example, larger dots may emit longer wavelength light, such as red light while smaller QDs may emit shorter wavelength light, such as blue light or violet light. For example, quantum dots formed from cadmium selenide (CdSe) may be gradually tuned to emit light from the red region of the visible spectrum for a 5 nm diameter quantum dot, to the violet region for a 1.5 nm quantum dot. By varying dot size, the entire visible wavelength, ranging from about 460 nm (blue) to about 650 nm (red), may be reproduced.

One of the common issues with quantum dots is that they are potentially toxic. Cadmium-free quantum dots or heavy metal-free quantum dots may be desirable for consumer goods applications. In other words, it may be useful to reduce the cadmium (Cd) content in a product below a threshold such that the cadmium is present only in trace or minimal amounts. Quantum dots with a stable polymer coating may be nontoxic. Another issue is the high production cost for the quantum dots in the display.

There remains a need for designing the quantum dot-enhanced liquid crystal display to achieve reduced toxicity, improved performance, and lower cost in fabrication.

SUMMARY

Embodiments described herein may provide a dichroic filter (DCF) on quantum dot-enhanced film (QDEF) in a liquid crystal display for transmitting a red light and a green light and a small portion of a blue light but reflecting most of the blue light, such that a white light is produced. The DCF helps reduce the density of quantum dots and thus may reduce toxic content, such as Cd content. The DCF also improves color and luminance uniformity. The DCF may also reduce quenching and thus manufacturing cost.

In one embodiment, a display device is provided. The display device includes a light source emitting a blue light, and a light emitting layer including a first group of red quantum dots and a second group of green quantum dots. The light emitting layer is configured to absorb a first portion of the blue light from the light source to emit red light and green light and to transmit a second portion of the blue light. The display device also includes a dichroic filter layer configured to reflect a portion of the transmitted second portion of the blue light such that the reflected portion of the blue light is recycled in the light emitting layer and to transmit a remaining portion of the transmitted second portion of the blue light to output a white light.

In another embodiment, a display device includes a light source emitting a blue light and a light emitting layer comprising a first group of red quantum dots and a second group of green quantum dots. The light emitting layer configured to absorb a first portion of the blue light from the light source to emit red light and green light and to transmit a second portion of the blue light. The display device also includes a dichroic filter layer configured to reflect a portion of the transmitted second portion of the blue light such that the reflected portion of the blue light is recycled in the light emitting layer and to transmit a remaining portion of the transmitted second portion of the blue light to output a white light. The display device further includes a liquid crystal display including a front polarizer, a rear polarizer, and a liquid crystal layer between the first polarizer and the second polarizer. The liquid crystal display also includes a plurality of color filters between the front polarizer and the liquid crystal layer. The liquid crystal display is configured to control passage of the white light from the dichroic filter through the color filters arranged in subpixels.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

DETAILED DESCRIPTION

The present disclosure may be understood by reference to the following detailed description, taken in conjunction with the drawings as briefly described below. It is noted that, for purposes of illustrative clarity, certain elements in the drawings may not be drawn to scale.

Figure 1A:
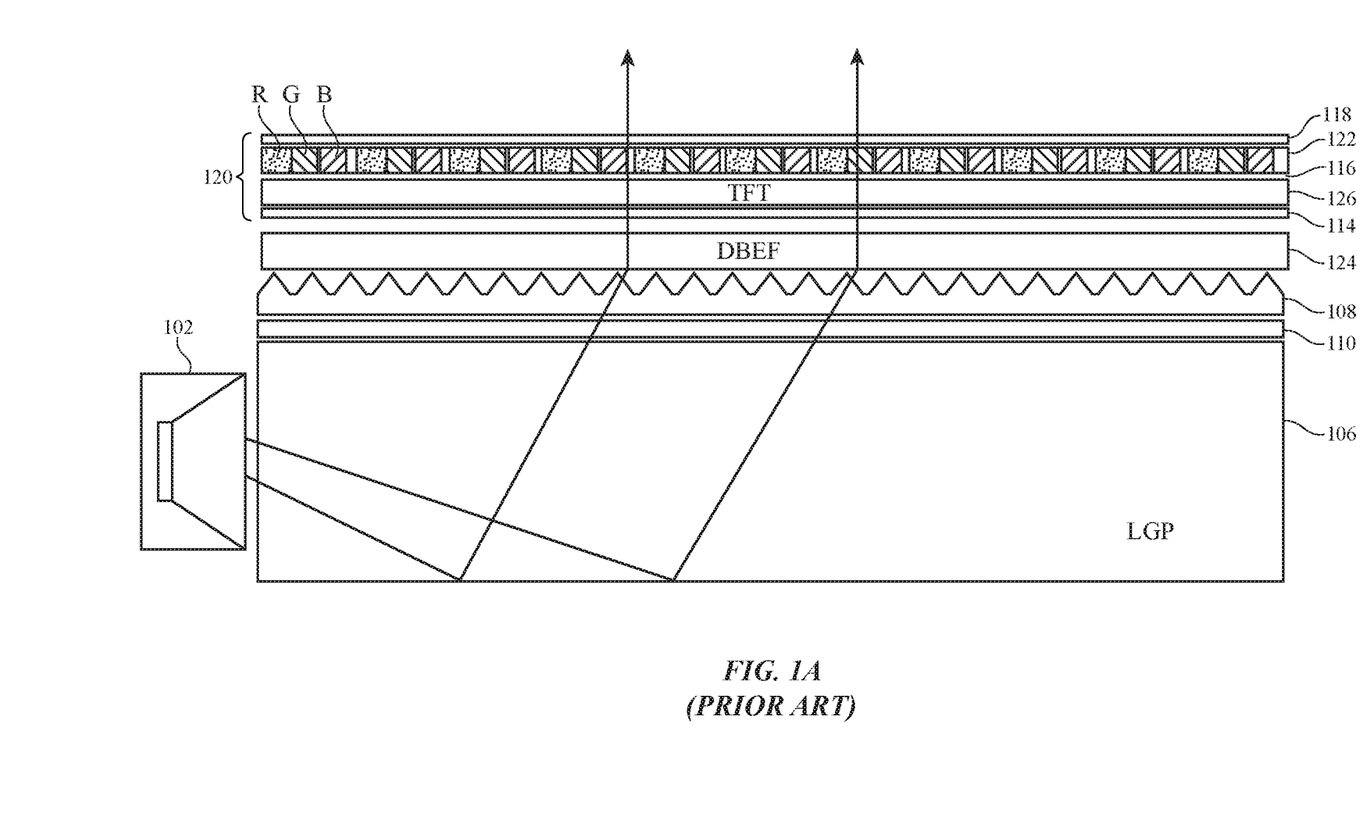
FIG. 1A illustrates a conventional liquid crystal display (LCD) with an edge lit configuration (Prior art).

FIG. 1A illustrates a conventional liquid crystal display (LCD) with an edge lit backlight configuration. The LCD of FIG. 1A includes a primary light source or backlight source 102, a light guide panel (LGP) 106, and a LCD panel 120. The conventional LCD of FIG. 1A uses the LCD panel 120 with control electronics and the backlight source 102 to produce color images. The backlight source 102 provides white light.

The liquid crystal display panel 120 includes color filters 122 arranged in subpixels, such as a red color filter, a green color filter, and a blue color filter. The red, green, and blue filters 122 transmit a light having a specific wavelength of white light incident from the backlight source 102. The filters 122 transmit wavelengths of light corresponding to the color of each filter, and absorb other wavelengths. Accordingly, a light loss is generated in the liquid crystal display by the color filters. In order to display images having a sufficient brightness, the backlight source 102 is typically used. However, this generally causes an increase in power consumption by the liquid crystal display.

The LCD panel 120 also includes a front polarizer 118, a rear polarizer 114, a thin film transistor (TFT) 126, and liquid crystal 116 as well as electrodes (not shown). The color filters 122 are positioned between the liquid crystal 116 and the front polarizer 118. The TFT 126 is positioned between the liquid crystal 116 and the rear polarizer 114. Each pixel has a corresponding transistor or switch for controlling voltage applied to the liquid crystal 116. The liquid crystal 116 may include rod-shaped polymers that naturally form into thin layers with a natural alignment. The electrodes may be made of a transparent conductor, such as an indium-tin-oxide material (commonly referred to as "ITO"). The front and rear polarizers 118 and 114 may be set at right angles. Normally, the LCD panel 120 may be opaque. When a voltage is applied across the liquid crystal 116, the rod-shaped polymers align with the electric field and untwist such that the voltage controls the light output from the front polarizer 118. For example, when a voltage is applied to the liquid crystal 116, the liquid crystal 116 rotates so that there is a light output from the front polarizer 118.

For a conventional LCD, a white LED, a cold-cathode fluorescent lamps (CCFL) or an incandescent backlighting may be used. Generally, a brighter light source may have a shorter life time and generate more heat.

As an example, the backlight source 102 includes one or more blue LEDs and yellow phosphor pumped by the blue LEDs to emit white light for the LCD. The white light from the backlight source 102 travels toward the light guide panel (LGP) 106, through diffuser film 110 and prism 108 as well as double brightness enhanced film (DBEF) 124, which provides a uniform light backlight for the liquid crystal display panel 120. The phosphors may include transition metal compounds or rare earth compounds. Alternatively, the backlight source 102 may include a white LED that provides white light to the light guide panel 106. The white LED may use a blue LED with broad spectrum yellow phosphor, or a blue LED with red and green phosphors.

Figure 1B:
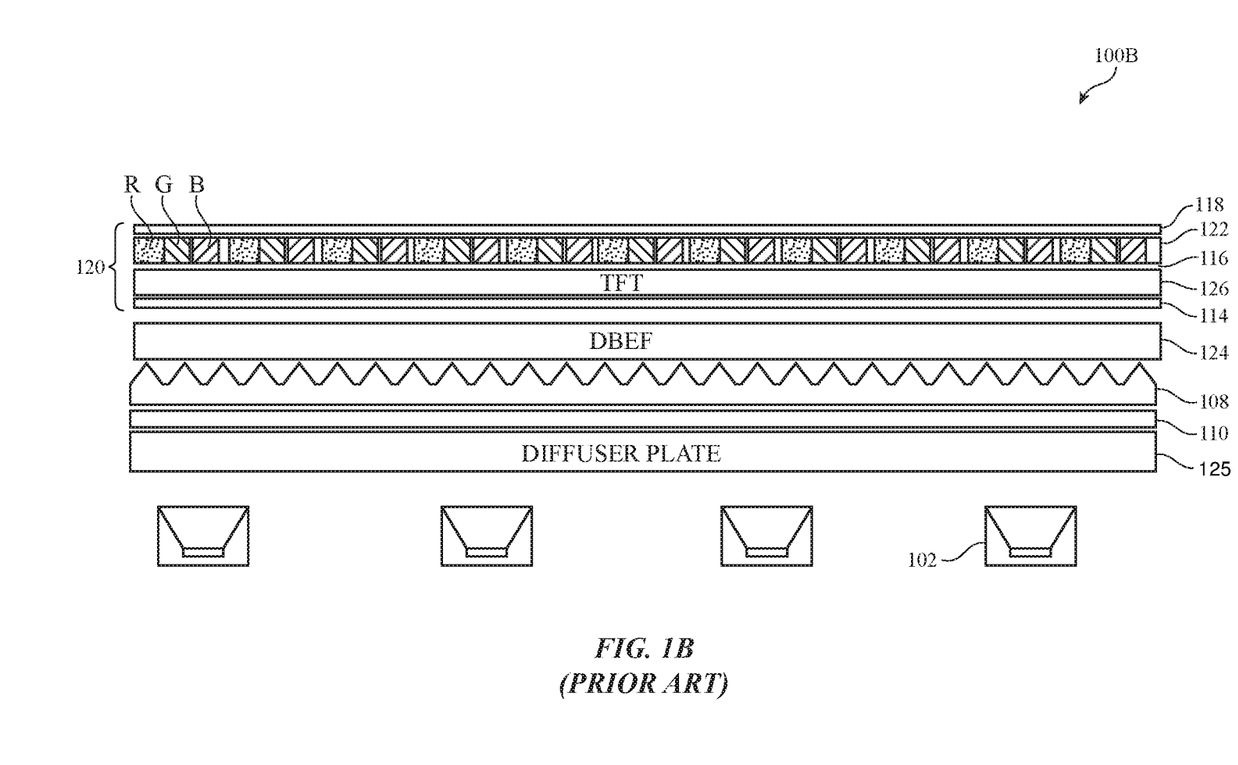
FIG. 1B illustrates a conventional liquid crystal display (LCD) with a direct lit configuration (Prior art).

FIG. 1B illustrates a direct lit backlight configuration for the conventional LCD. As shown, the main differences from the edge lit configuration 100B include different arrangement of a number of LEDs and absence of the LGP 106. More specifically, the LEDs 102 are arranged to directly provide light to a diffuser plate 125, which is normally thicker than the diffuser film 110 and thus supports the diffuser film 110.

Figure 2:
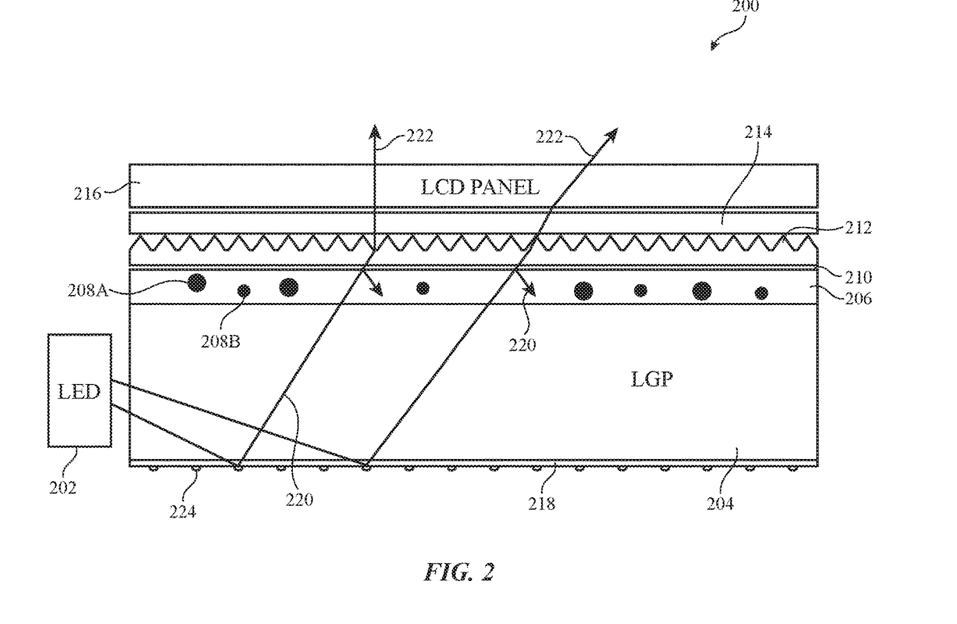
FIG. 2 illustrates a quantum dot-enhanced display with a dichroic filter in an embodiment.

FIG. 2 illustrates a quantum dot-enhanced liquid crystal display with a dichroic filter (DCF) incorporated in a sample embodiment. Quantum dot-enhanced liquid crystal display 200 includes a light source 202, a light guide panel (LGP) 204, a quantum dot-enhanced film (QDEF) 206, a DCF 210, a LCD panel 216. The QD enhanced display 200 may also optionally include a prism 212 and a double brightness enhanced film (DBEF) 214. The light source 202 may be a blue light-emitting diode (LED) or a blue Gallium Nitride (GaN) LED.

To produce even lighting, a blue light from the light source 202 first passes through the LGP 204 that may include a series of unevenly-spaced bumps or light extraction features 224 and a reflector 218 behind the light extraction features 224. The LGP 204 diffuses the blue light through the series of unevenly-spaced bumps or light extraction features 224, as shown by blue light 220. The density of the bumps or light extraction features increases further away from the light source 202. The front face of the LGP 204 faces the LCD panel 216 and the back of the LGP 204 has the reflector 218, which guides otherwise wasted light back toward the LCD panel 216. In one example, the reflector 218 may be made of highly reflective material, such as white polyethylene terephthalate (PET) and in one embodiment reflects about 97% of all light impacting its surface.

The LCD panel 216 also includes color filters arranged in subpixels, a front polarizer, a rear polarizer, and liquid crystal as well as electrodes, similar to the LCD panel 120 for the conventional LCD. Generally, there is an air space between the LCD panel 216 and the DBEF 214.

Unlike the conventional LCD, instead of using the red phosphor 110A and green phosphor 110B, the QDEF 206 including red QDs 208A and green QDs 208B produces red color and green color, which are excited by the blue light from the light source 202. The QDEF 206 converts the color while diffusing the blue light 220 from the light source 202.

Generally, the QDEF 206 is configured to transmit a portion of the blue light 220 from the light source 202 such that white light 222 comes out of the QDEF 206. The QDEF 206 includes a group of red quantum dots (QDs) 208A and green QDs 208B, which actively convert the blue light 220 from the LED into red light and green light through the quantum dots. When the QDs 208A and 208B are irradiated by the blue light from the light source 202, the blue light causes the QDs 208A and 208B to photoluminescence and thereby produce secondary light. The color of the secondary light is generally a function of the size, size distribution and composition of the QDs 208A and 208B.

It will be appreciated by those skilled in the art that the QD enhanced display may vary in configuration. For example, other lit configurations may be used, including a direct lit configuration in some embodiments, similar to the direct lit configuration shown in FIG. 1B. The prism 212 may also be removed or substituted by other brightness enhancement component in an alternative embodiment. The DBEF 214 may be removed in another embodiment.

The QDEF 206 may include a host matrix. The QDEF 206 may also include red QDs and green QDs 208A and 208B disposed in the host matrix. The host matrix allows light from the light source 202 to pass through. The host matrix may be any polymer, such as polyacrylate, polystyrene, polyimide, polyacrylamide, polyethylene, polyvinyl, polydiacetylene, polyphenylene-vinylene, polypeptide, polysaccharide, polysulfone, polypyrrole, polyimidazole, polythiophene, polyether, epoxies, silica glass, silica gel, siloxane, polyphosphate, hydrogel, agarose, cellulose, and the like.

Widely used methods of forming the QD include a chemical wet method or a chemical vapor. The chemical wet method mixes precursors with an organic solvent and grows particles to form the QD through a chemical reaction.

Enhancement or quenching of the radiation of the QDs may be achieved by adjusting the size of the QD, changing structure or adding other materials. Quenching may help increase light efficiency. Higher efficiency means that more red light or green light will be produced from red QDs and green QDs by using the same light source 202. When QDs are stuck to each other, for example, a red QD is stuck to a green QD, the red QD may be re-excited by the green QD, which may increase the light efficiency of the red light, but may reduce the light efficiency of the green light. Thus, it is desirable to have the QDs separated from each other in the host matrix. When the QD density is reduced because of the recycling of the blue light through use of the DCF, there will be less likelihood for the QDs to stick to each other and thus to improve light efficiency. Therefore, quenching may be minimized to reduce manufacturing cost.

As an example of the QD, a group II-VI compound, such as CdSe, CdTe, CdS, ZnSe, ZnTe, ZnS, HgTe, or HgS, may be used. Also, the QD may also have a core-shell structure. The core comprises at least one selected from the groups consisting of CdSe, CdTe, CdS, ZnSe, ZnTe, ZnS, HgTe, and HgS, and the shell comprises at least one selected from the groups consisting of CdSe, CdTe, CdS, ZnSe, ZnTe, ZnS, HgTe, and HgS. Further, a group III-V compound such as GaN, InAs, GaAs, GaInP may be applied to the core or shell.

As shown in FIG. 2 the DCF 210 is used in front of the QDEF 206 to recycle the blue light 220. The DCF 210 recycles the blue light 220 from the light source 202 within the QDEF 206 by reflecting a portion of the blue light 220, although the DCF 210 still transmits a small portion of the blue light 220 to provide the white light 222 to the LCD panel 216. This recycling of the blue light 220 helps reduce the CdSe content, and also improves color and luminance uniformity. Quenching will also be reduced as a result of reduced QD density.

The QD enhanced display 200 may optionally include brightness enhancement components, such as a prism 212 and a double brightness enhanced film (DBEF) 214. The brightness enhancement components are optically transparent. The prism 212 helps reduce beam angle and thus increases light intensity through the DBEF 214. The DBEF may be provided by manufacturers, such as 3M® among others.

The DBEF 214 is a reflective polarizer film which increases efficiency by repeatedly reflecting any unpolarized light back, which would otherwise be absorbed by the LCD's rear polarizer. The DBEF 214 is placed behind the liquid crystal display panel 216 without any other film in-between. The DBEF 214 may be mounted with its transmission axis substantially parallel to the transmission axis of the rear polarizer. The DBEF 214 helps recycle the white light 222 that would normally be absorbed by the rear polarizer (not shown) of the liquid crystal panel 216, and thus increases the brightness of the liquid crystal display panel 216.

Figure 3:
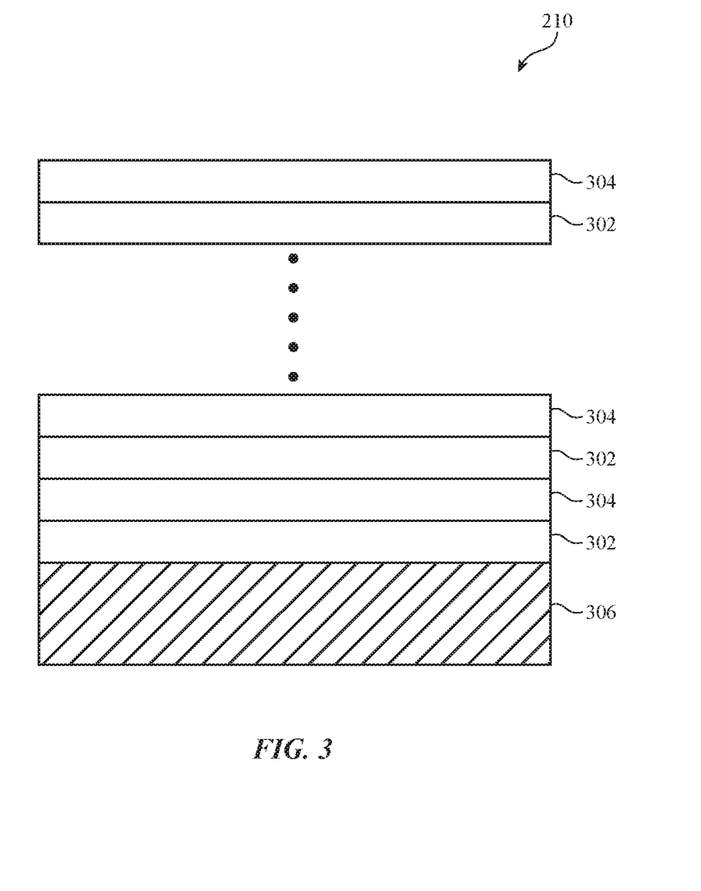
FIG. 3 illustrates a detailed structure of the dichroic filter (DCF) of FIG. 2 in an embodiment.

FIG. 3 illustrates a detailed structure of the DCF 210 in an embodiment. The DCF 210 is optically transparent. The DCF 210 may include alternating layers 302 and 304 of optical coatings with different refractive indexes and a glass substrate 306. For example, layer 302 has a first refractive index and layer 304 has a second refractive index different from the first refractive index. The interfaces between the alternating layers 302 and 304 of different refractive indexes produce phased reflections, selectively reinforcing certain wavelengths of light and interfering with other wavelengths. In this disclosure, each of layers 302 and 304 has a thickness of about ¼ of the wavelength of the blue light.

The DCF 210 may be fabricated by vacuum deposition. The DCF 210 may be coated on the QDEF 206. The DCF 210 may also be a separate sheet which is placed over the QDEF 206. The transmission and reflection band of the DCF 210 may need to be properly aligned with the spectra of red, green and blue light.

Figure 4:
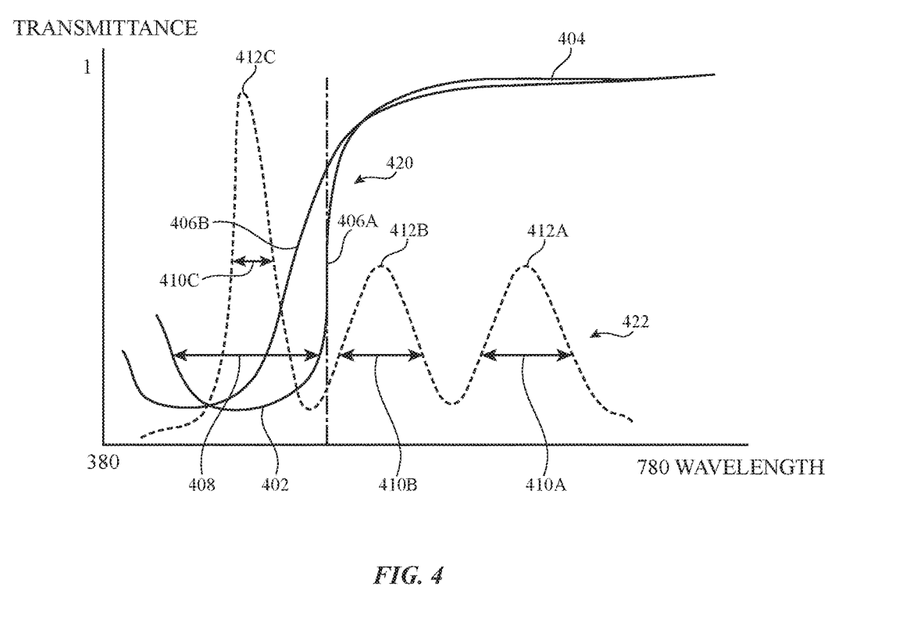
FIG. 4 illustrates transmittance versus wavelength for the dichroic filter of FIG. 3 and an emission curve of QDs in an embodiment.

FIG. 4 illustrates an emission curve 422 of QDs and a transmittance curve 420 for the DCF 210. As shown in the emission curve 422, each of the red, green, and blue color bands 412A-C emitted from the QDs is separated from each other. In other words, an emission color bandwidth 410 of the QDs is relatively narrow. Each of the emission color bandwidth 410A-C for respective quantum dots 412A, 412B, 412C varies with color and material. For example, CdSe quantum dots may have a blue emission bandwidth 410 of about 35 nm. InP quantum dot may have a blue emission bandwidth 410 of about 45 nm, which is wider than that of the CdSe quantum dot.

As shown in FIG. 4, the DCF 210 also has a low transmittance over a blue region 402 (see transmittance curve 420). Typically, the transmittance of the DCF 210 is not zero. A small portion of the blue light 220 as shown in FIG. 2 is transmitted through the DCF 210, such that the white light 222 also shown in FIG. 2 will be produced by combining the blue light from the light source 202 with the red and green lights from the QDs 208A and 208B. The transmittance in the blue region 402 may be at certain percentage, for example 25%, but may not be more than 50%. The transmittance of the blue region 402 may vary with the number of the layers 302 and 304 in the DCF 210 (see FIG. 3). As shown in FIG. 4, the transmittance over a region 404 including the green and red regions as well as beyond the red region 404 is nearly 100%. The transmission curve 420 also includes a transition region or slope 406A or 406B may vary with a light incident angle. For example, slope 406A at 0 degree angle of incidence (AOI) is steeper than slope 406B at 45 degree AOI.

The transmittance blue region 402 has a reflection band bandwidth 408, which may vary with coating materials for layers 302 of a first refractive index and layers 304 of a second refractive index in the DCF 210. The reflection band width 408 often increases with the refractive index difference between the two coating materials having the first refractive index and the second refractive index.

The DCF 210 has a different function from the color filters 122 for the conventional LCD, because the conventional color filters 122 absorb a light in a color band while the DCF 210 reflects a light in the reflection band 408. Thus, the DCF 210 generates less heat than the color filters 122. The DCF 210 also has a longer life than the color filters 122.

Figure 5:
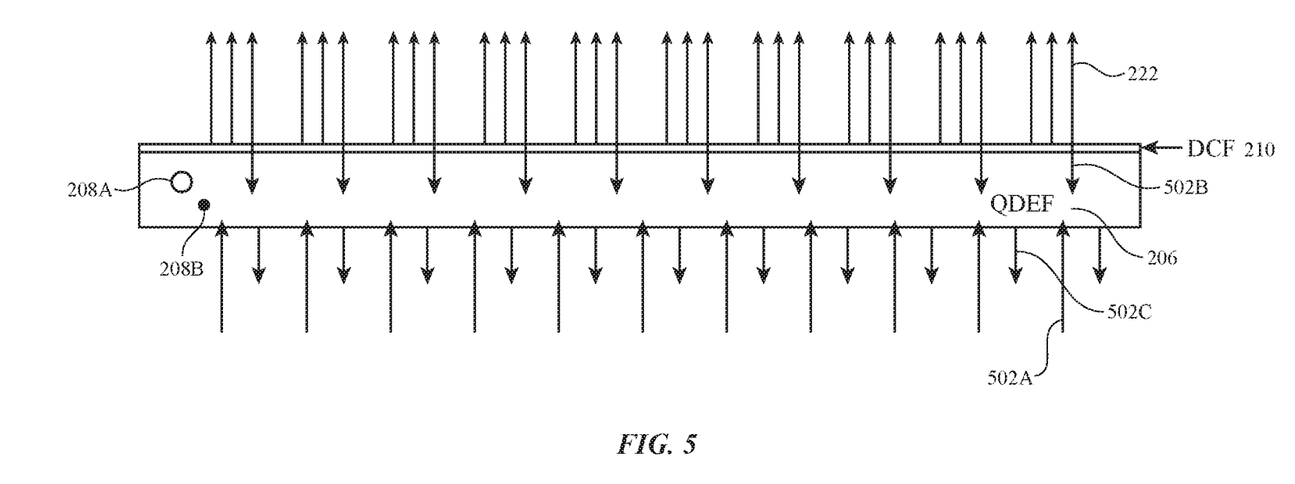
FIG. 5 illustrates the recycling of blue light in the QDEF by the dichroic filter in an embodiment.

FIG. 5 illustrates recycling blue light in the QDEF in an embodiment. A larger portion 502B of the incoming blue light 502A is reflected by the DCF 210. A portion of this reflected blue light will excite the red QDs 208A and green QDs 208B in the QDEF 206 to increase the output of the red light and green light. This is a first order recycling. The red and green QDs 208A and 208B also diffuse the incoming blue light 502A more to help increase uniformity of a white light 222 through the DCF 210, which is one of the benefits of including the DCF in the QD enhanced display 200. A remaining portion 502C of the reflected blue light 502B will enter the light guide panel 112 (not shown) and reflected from the reflector 218 at the bottom of the LGP 204 and will re-enter the QDEF 206 again and excite more red and green QDs 208A and 208B. Again, a portion of the remaining portion 502C will be reflected again by the DCF 210, which is the second order recycling. This recycling will continue until no blue light will be reflected by the dichroic filter 210.

The dichroic filter 210 helps reduce the density of the red and green quantum dots 208A and 208B through recycling the blue light 502, which increases the emissions from each red QD 208A and green QD 208B. This reduction in QD density leads to less CdSe used in the quantum dot-enhanced liquid crystal display 200, which helps achieve a lower Cd content to meet the Cd free requirement of consumer goods.

Figure 6:
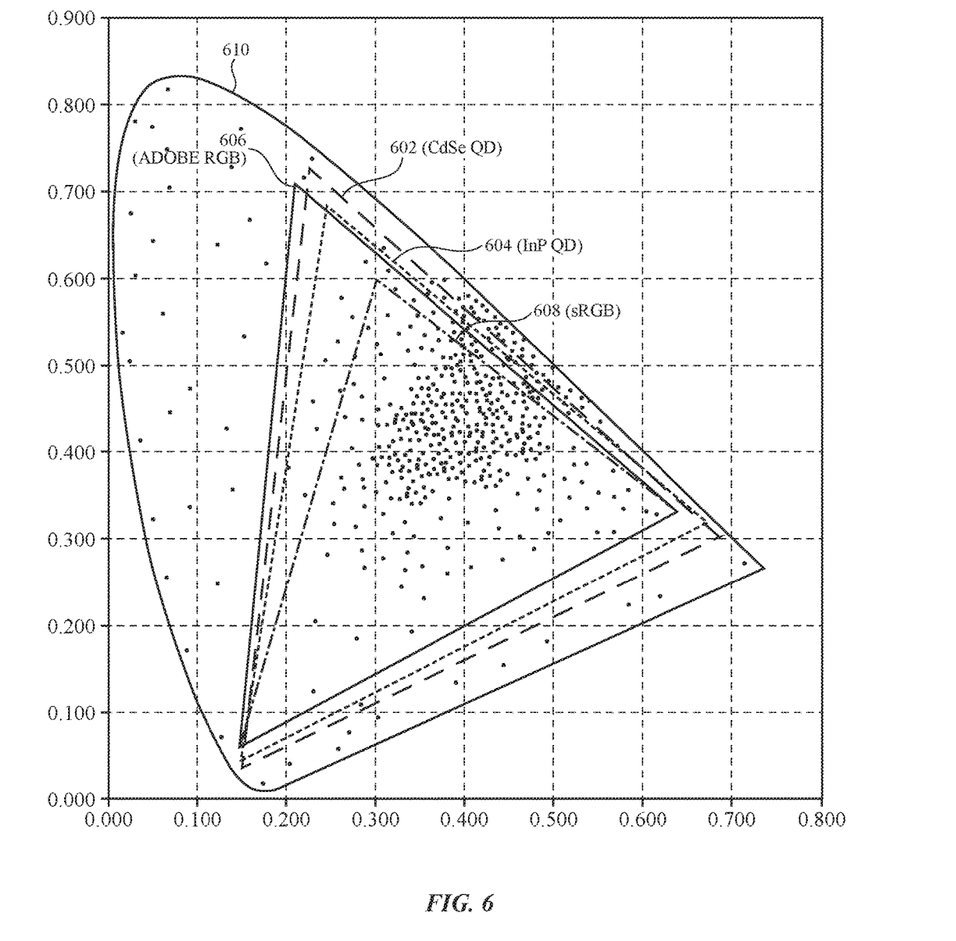
FIG. 6 illustrates color gamuts for the quantum dot-enhanced display of FIG. 2 and the LCD of FIG. 1 in an embodiment.

FIG. 6 illustrates color gamuts for the quantum dot-enhanced display and the LCD of FIG. 2. A color gamut is a portion of the color space that may be reproduced or represented. For example, color gamuts 602 (CdSe QD), 604 (InP QD), 606 (Adobe RGB) and 608 (standard RGB or sRGB) are a portion of real color space 610. Currently, conventional LCD meets the standard color gamut 608, also labeled as "sRGB". To provide a more full color than the conventional LCD, newer color gamut 606, also labeled as "Adobe RGB", is desired, because newer color gamut 606 has a larger area than the standard color gamut 608 and is closer to real color space 610. As shown in FIG. 6, the QD enhanced LCD 200 is better than the conventional LCD (e.g. sRGB), because the CdSe QD color gamut 602 and InP QD color gamut 604 for the QD enhanced LCD 200 have larger triangle areas than the standard color gamut 608 of the conventional LCD.

Additionally, the color saturation of the CdSe QD enhanced display is more close to the desired Adobe RGB or better than the InP QD enhanced display. Although InP QD enhanced display 200 is a Cd free consumer product, its color gamut is not as good as the CdSe QD enhanced display. For the CdSe QD enhanced display with wider color gamut, the Cd content may be reduced below a threshold by including the DCF 210 to recycle blue light and thus reduce QD density, which is essentially considered Cd free, or comparable to the InP QD enhanced display.

The QD enhanced display 200 with the QDEF 206 and the DCF 210 is characterized by better color accuracy and narrow bandwidth as well as or wider color gamut than the conventional LCD. The conventional LCD can't produce pure red, green and blue for the display. Instead, the LCD needs to add a few other colors to the Red, Green and Blue colors.

The QD enhanced display 200 is generally much brighter than the conventional LCD display as a result of its wider color gamut. The quantum dot-enhanced display 200 using a blue LED as a backlight, may have a power efficiency similar to the conventional LCD using a white LED backlight. However the QD-enhanced display 200 typically has a much wider color gamut than the conventional LCD backlit with a white LED. In other words, for the conventional LCD to achieve the same color gamut as the quantum dot-enhanced display 200, power efficiency would be much lower than the quantum dot-enhanced display.

Furthermore, some light loss may occur during blue light recycling by the DCF 210. However, by using highly transmissive materials in some color regions such as red and green and highly reflected materials in another color region such as the blue region for the DCF 210, light loss may be reduced and/or minimized. In addition, the DCF may help reduce quenching and thus may increase power efficiency. These two factors affect the power efficiency and may cancel each other when taken together in a system, such that about the same electrical power may be consumed by an LCD using the DCF 210 as without the DCF 210.

The quantum dot includes a material selected from the group consisting of a group II-VI compound, a group III-V compound, a group IV-VI compound, a group IV compound, and mixtures of these groups.

The group II-VI compound includes a material selected from the group consisting of CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, and HgZnSTe.

The group III-V compound includes a material selected from the group consisting of GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, and InAlPSb.

The group IV-VI compound comprises a material selected from the group consisting of SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, and SnPbSTe.

The group IV compound comprises a material selected from the group consisting of Si, Ge, SiC, and SiGe.

If desired, display 200 may have backlight structures (sometimes referred to as a backlight unit) that include two dichroic filters to enhance light recycling and backlight efficiency. For example, a first dichroic filter may be placed below film 206 and a second dichroic filter may be placed above film 206. Film 206 may be a light-conversion film that converts light of one color (e.g., blue light) into light of at least one different color (e.g., yellow light or red and green light). Film 206 may be a quantum dot film with red and green quantum dots or may be a phosphor film with red and green phosphor particles in place of red and green quantum dots. Light-conversion film 206 may be edge lit or may be directly lit by blue light-emitting diodes (or light-emitting diodes of other colors).

Figure 7:
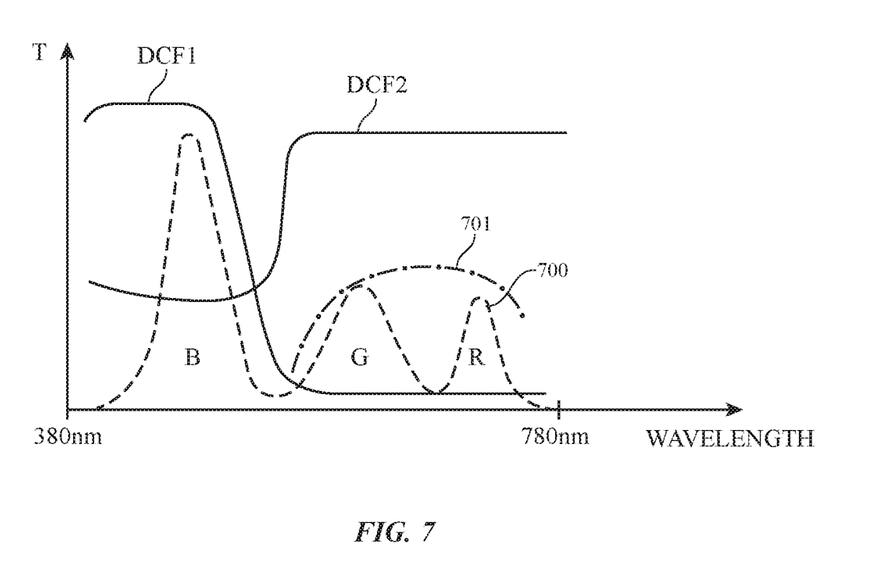
FIG. 7 is a graph of illustrative an illustrative backlight emission spectrum and transmission curves for illustrative dichroic filters in accordance with an embodiment.

The emission spectrum of the blue light-emitting diodes and the red and green emissive elements (quantum dots or phosphors) may be characterized by an intensity versus wavelength characteristic such as curve 700 of FIG. 7. If desired, the red and green elements in film 206 may be replaced by yellow phosphors or yellow quantum dots that produce a yellow spectral peak such as peak 701. Illustrative configurations for the backlight structures of display 200 that include red and green emissive structures that produce respective red and green output peaks are described herein as an example.

The first dichroic filter may have a high transmission in the blue (B) portion of the spectrum while reflecting red (R) and green (G) light, as shown by the illustrative transmission spectrum DCF1 of FIG. 7. This allows blue light to pass through the first dichroic filter into film 206 while helping to recycle any downwardly reflected red and green light back into film 206. As indicated by transmission characteristic DCF2 for the second dichroic filter, the second dichroic filter may have a moderate transmission for blue (B) light (so that blue light is recycled through film 206 rather than being immediately emitted from the upper surface of film 206) and high transmission for red (R) and green (G) light (so as not to block red and green light being emitted by film 206).

Figure 8:
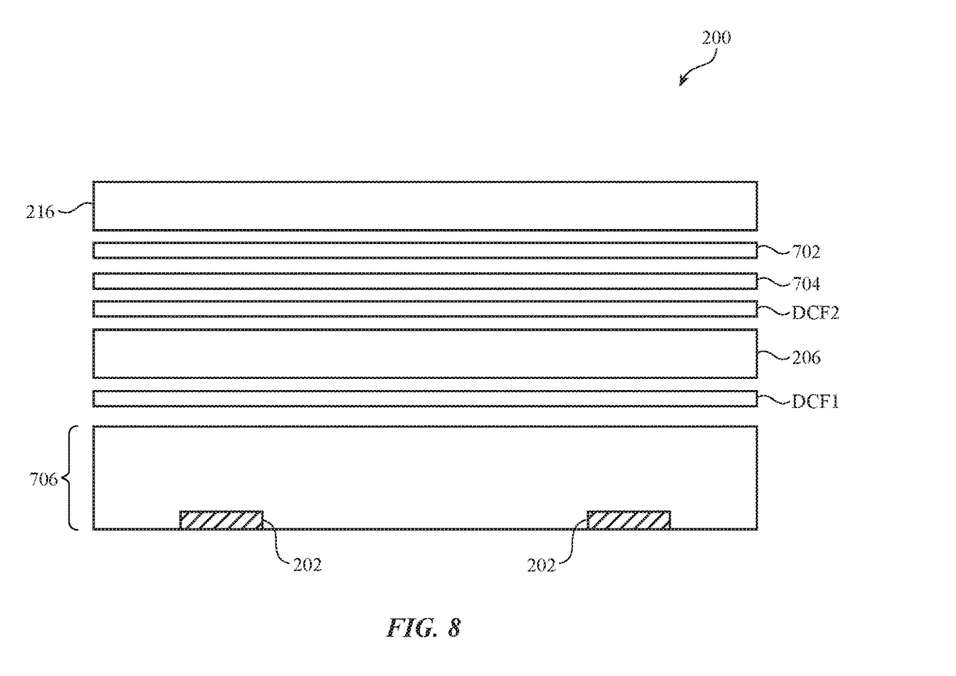
FIGS. 8, 9, and 10 are cross-sectional side views of illustrative displays with multiple dichroic filters in accordance with embodiments.
Figure 9:
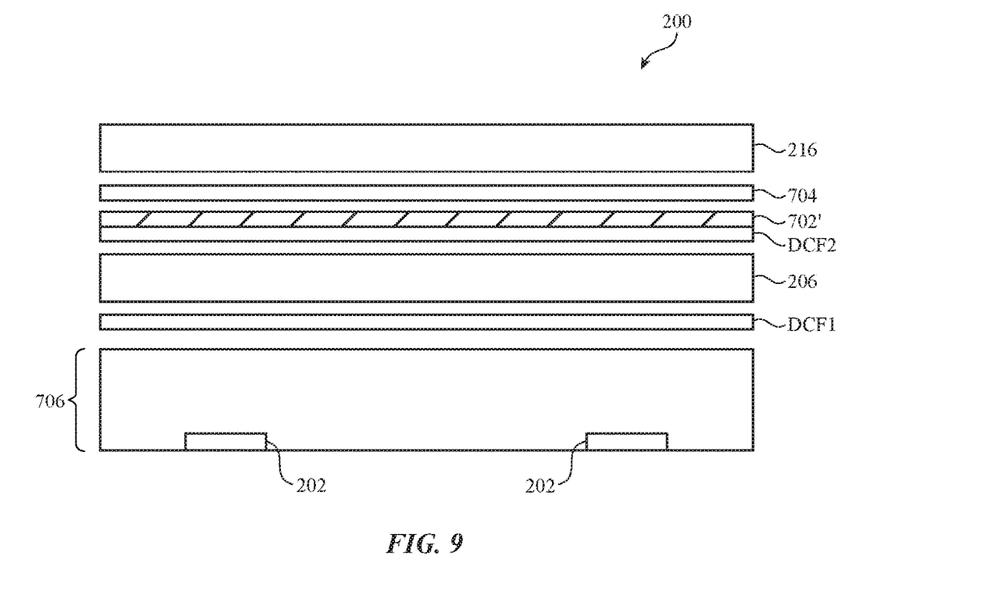
Figure 10:
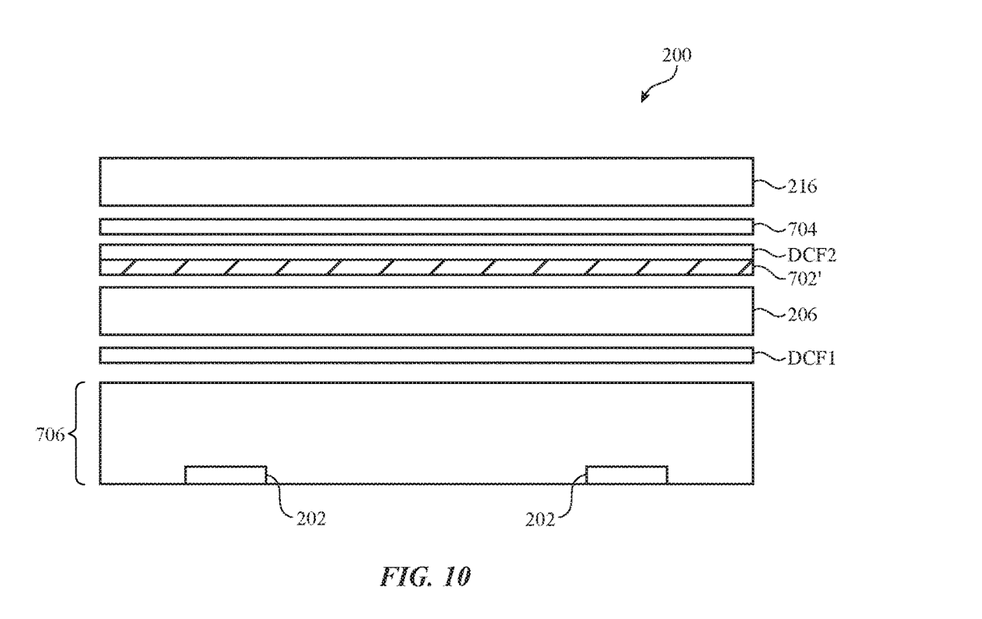

Illustrative configurations for incorporating dichroic filters DCF1 and DCF2 into the backlight structures of display 200 are shown in FIGS. 8, 9, and 10. In these examples, display 200 is directly lit (i.e., blue light is produced by an array of light-emitting diodes 202 so that display 200 can be locally dimmed to enhance dynamic range). Light-emitting diodes 202 may emit light into backlight structure 706 (e.g., an air gap, a clear panel, a diffuser panel, or other structure). Edge-lit configurations may be used, if desired (e.g., by placing one or more blue light-emitting diodes 202 along the edge of a light-guide plate). The configurations of FIGS. 8, 9, and 10 are merely illustrative.

As shown in FIG. 8, dichroic filter DCF1 may be placed below film 206. The blue light transmission properties of filter DCF1 (e.g., blue light transmission of about 70-90%, 80% or more, 90% or more, 95% or more, etc.) allow blue light from diodes 202 to efficiently pass into film 206. Some of the blue light is converted into red and green light by film 206. Outwardly directed red and green light from film 206 may pass through filter DCF2, which preferably transmits 80% or more, 90% or more, or 95% or more of the light at red and green light wavelengths. Inwardly directed red and green light from film 206 may be reflected back outwards by filter DCF1 (which preferably transmits less than 5-20% of red and green light and therefore reflects at least 80%, 90% or more, or 95% or more of the red and green light outward through display module 216). Filter DCF2 reflects excess blue light (i.e., filter DCF2 preferably inwardly reflects about 55% or more, 65% or more, or 75% or more of the outwardly directed blue light), so that blue light that has not been converted into red or green light is reflected back through film 206, thereby enhancing blue light recycling.

Light recycling may be further enhanced using other light recycling structures. For example, prism layer 704 may recycle on-axis light downwards through film 206 (i.e., layer 704 may reflect light that is oriented directly upwards in the orientation of FIG. 8 back in the downwards/inwards direction) while collimating off-axis light. Reflective polarizer 702 may have a pass axis that is aligned with the pass axis of the lower polarizer of liquid crystal display unit 216. Light with different polarizations will be reflected back through film 206 and recycled.

If desired, the thickness of the backlight structures may be minimized by using a thin reflective polarizer film that is supported by dichroic filter DCF2 rather than stand-alone reflective polarizer 702 of FIG. 8. In the example of FIG. 9, thin reflective polarizer layer 702' has been laminated to the upper surface of dichroic filter DCF2, so that layer 702' is interposed between prism layer 704 and filter DCF2. In the example of FIG. 10, thin reflective polarizer layer 702' has been laminated to the lower surface of dichroic filter DCF2.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A display, comprising:
   a display module; and
   backlight structures that provide light to the display module, wherein the backlight structures include:
   blue light-emitting diodes that provide blue light;
   a light-conversion film that converts the blue light into light of at least one different color;
   a first dichroic filter;
   a second dichroic filter, wherein the light-conversion film is interposed between the first and second dichroic filters; and
   a prism layer interposed between the second dichroic filter and the display module, wherein the prism layer reflects on-axis light and collimates off-axis light.

2. The display defined in claim 1 wherein the light-conversion film comprises a phosphor film.

3. The display defined in claim 1 wherein the light-conversion film comprises a quantum dot film.

4. The display defined in claim 1 wherein the first dichroic filter and the second dichroic filter have different transmission spectrums.

5. The display defined in claim 1 further comprising a reflective polarizer laminated to the second dichroic filter.

6. The display defined in claim 1 wherein the light of the different color includes red light and green light and wherein the light of the different color is reflected by the first dichroic filter.

7. The display defined in claim 1 wherein the light of the different color includes yellow light that is reflected by the first dichroic filter.

8. The display defined in claim 1 wherein the first dichroic filter is interposed between the light-conversion film and the light-emitting diodes.

9. The display defined in claim 1 wherein the second dichroic filter is interposed between the display module and the light-conversion film.

10. The display defined in claim 1 wherein the display module comprises a liquid crystal display module.

11. The display defined in claim 1 wherein the blue light-emitting diodes are arranged in an array and directly light the light-conversion film.

12. The display defined in claim 1 further comprising a reflective polarizer, wherein the prism layer is interposed between the second dichroic filter and the reflective polarizer.

13. The display defined in claim 1 wherein the first dichroic filter passes blue light and reflects the light of the different color.

14. The display defined in claim 13 wherein the second dichroic filter reflects more blue light than passes blue light and wherein the second dichroic filter passes the light of the different color.

15. The display defined in claim 1 wherein the light-conversion film comprises a quantum dot film with red and green quantum dots and wherein the light of the different color comprises red and green light from the red and green quantum dots.

16. The display defined in claim 15 wherein the first dichroic filter reflects at least 95% of the red and green light and passes at least 90% of the blue light.

17. The display defined in claim 16 wherein the second dichroic filter reflects at least 55% of blue light exiting the quantum dot film and passes at least 95% of the red and green light from the quantum dot film.

18. A display, comprising:
- a liquid crystal display module;
- backlight structures that provide backlight for the liquid crystal display module, wherein the backlight structures comprise:
  - a blue light-emitting diode that produces blue light;
  - a quantum dot film that receives the blue light and that produces light of a different color;
  - a first dichroic filter;
  - a second dichroic filter, wherein the quantum dot film is interposed between the first and second dichroic filters; and
  - a prism layer interposed between the second dichroic filter and the liquid crystal display module, wherein the prism layer reflects on-axis light and collimates off-axis light.

* * * * *